(12) United States Patent
Chaloupka et al.

(10) Patent No.: US 7,523,975 B2
(45) Date of Patent: Apr. 28, 2009

(54) STORAGE COMPARTMENT FOR A VEHICLE

(75) Inventors: Juergen Chaloupka, Wetter (GB);
Oliver Hasenoehrl, Hildrizhausen (GB);
Ralf Zipperle, Althengstett (GB)

(73) Assignee: Daimler AG, Stuttgart (DE)

( * ) Notice: Subject to any disclaimer, the term of this patent is extended or adjusted under 35 U.S.C. 154(b) by 232 days.

(21) Appl. No.: 10/518,747

(22) PCT Filed: May 21, 2003

(86) PCT No.: PCT/EP03/05305

§ 371 (c)(1),
(2), (4) Date: Jul. 29, 2005

(87) PCT Pub. No.: WO04/000607

PCT Pub. Date: Dec. 31, 2003

(65) Prior Publication Data

US 2006/0163898 A1    Jul. 27, 2006

(30) Foreign Application Priority Data

Jun. 25, 2002   (DE)   ................................ 102 28 399

(51) Int. Cl.
*B60R 7/06* (2006.01)
(52) U.S. Cl. .................... 296/37.1; 296/37.8; 220/264; 220/830
(58) Field of Classification Search ................ 296/37.1, 296/37.8, 37.12; 292/34–37, 41; 49/394; 220/211, 260, 263, 264, 830
See application file for complete search history.

(56) References Cited

U.S. PATENT DOCUMENTS

| | | | | |
|---|---|---|---|---|
| 3,810,275 A | * | 5/1974 | Smith | ........................... 16/298 |
| 4,355,837 A | * | 10/1982 | Shimizu et al. | .......... 296/37.12 |
| 5,067,625 A | | 11/1991 | Numata | |
| 5,067,755 A | * | 11/1991 | James | ........................... 292/33 |
| 5,647,652 A | | 7/1997 | Zalewski et al. | |
| 5,826,922 A | * | 10/1998 | Wernig | ........................ 292/39 |
| 5,937,583 A | * | 8/1999 | Lamperti | ...................... 49/386 |
| 5,951,083 A | * | 9/1999 | Bittinger et al. | .......... 296/37.12 |
| 6,116,674 A | * | 9/2000 | Allison et al. | .............. 296/37.8 |
| 6,142,333 A | | 11/2000 | Sasamoto et al. | |
| 6,244,647 B1 | * | 6/2001 | Allison | ..................... 296/37.12 |
| 6,669,243 B2 | * | 12/2003 | Katoh et al. | ................... 292/34 |
| 6,761,278 B2 | * | 7/2004 | Hyp et al. | ................. 200/254.2 |
| 6,857,538 B2 | * | 2/2005 | Lin | ............................. 220/830 |

(Continued)

FOREIGN PATENT DOCUMENTS

EP    0490468 A1    6/1992

(Continued)

*Primary Examiner*—Glenn Dayoan
*Assistant Examiner*—Gregory Blankenship
(74) *Attorney, Agent, or Firm*—Crowell & Moring LLP (57) ABSTRACT

A storage compartment for a vehicle has a storage compartment cover which is pivotably mounted toward two sides. The latter can be pivoted either toward one side or toward the other side. In order to design the storage compartment such that it can be operated as simply and conveniently as possible and is secure, provision is made for the storage compartment cover to have two locked axes of rotation in its closed position. After one axis of rotation is released, a driving device automatically pivots the storage compartment cover in a damped manner into an open position.

20 Claims, 6 Drawing Sheets

U.S. PATENT DOCUMENTS

| | | | |
|---|---|---|---|
| 6,857,675 B2* | 2/2005 | Kurachi et al. | 296/37.12 |
| 6,937,836 B2* | 8/2005 | Wasai | 399/301 |
| 7,036,852 B2* | 5/2006 | Cho | 292/33 |
| 7,156,440 B2* | 1/2007 | Katagiri | 296/37.12 |
| 7,188,871 B2* | 3/2007 | Nemoto et al. | 292/170 |
| 7,204,527 B2* | 4/2007 | Geurden | 292/122 |
| 7,216,459 B1* | 5/2007 | Akkala et al. | 52/20 |
| 2002/0002757 A1 | 1/2002 | Hyp et al. | |
| 2003/0173369 A1* | 9/2003 | Nikolaus et al. | 220/830 |
| 2005/0104380 A1* | 5/2005 | Cho | 292/33 |
| 2005/0205591 A1* | 9/2005 | Kogami | 220/830 |

FOREIGN PATENT DOCUMENTS

| | | |
|---|---|---|
| EP | 0495290 A1 | 7/1992 |
| EP | 0501021 A1 | 9/1992 |
| EP | 0562244 A1 | 9/1993 |
| EP | 0495290 B1 | 6/1995 |
| EP | 0501021 B1 | 6/1995 |

* cited by examiner

STORAGE COMPARTMENT FOR A VEHICLE

BACKGROUND AND SUMMARY OF THE INVENTION

This invention relates to a storage compartment for a vehicle.

In vehicles, in particular passenger vehicles, there is the need for closable deposit compartments which are easily accessible.

European document EP 501 021 B1 describes a deposit compartment with a cover which can be opened toward two sides. A gear device arranged in the cover ensures here that, after the cover is released, via release handles likewise arranged in the cover, the cover can be opened manually either in one or in the other direction. In this case, the gear device locks the particular other pivot axis as a consequence of the rotation of the cover. A disadvantage here is the structurally complex solution allowing the cover to become relatively thick and heavy.

European document EP 0 495 290 B1 likewise discloses a deposit compartment for vehicles that has a cover which can be opened toward two sides. The cover has hinges which can be released on both sides and are of latching design. The hinges mount the cover pivotably, so that the latter, after the hinge is released on one side, can execute a pivoting movement and can be opened manually. Disadvantages here are that the deposit-compartment operation is not very convenient, and the hinge solution is of a relatively large size and constricts the opening cross section of the deposit compartment.

It is an object of the present invention to provide a storage compartment for vehicles which permits objects to be safely accommodated, can be operated simply and conveniently, and is constructed as compactly as possible.

This object is achieved according to the invention by a storage compartment as claimed.

The storage compartment has a deposit compartment which can be closed by a storage compartment cover. The storage compartment cover is locked in the closed position and has two axes of rotation, i.e. it can be opened either toward one side or toward the other side by pivoting about an axis of rotation. In the closed position, the two axes of rotation of the storage compartment cover are locked, so that the deposit compartment is securely closed and the objects deposited in it are secured against unauthorized access. The storage compartment has a driving device which, after release of the lock of one axis of rotation, automatically opens the storage compartment cover. The storage compartment cover can be automatically opened by means of a simple release of one axis of rotation, preferably by pressing a button. This permits a particularly convenient operation of the storage compartment from two sides. The storage compartment may thus be arranged, for example, in a central console or in the cockpit region or in an armrest between two seats, and is equally easily accessible from both seats.

Provision is made for a retaining device which is designed for locking both axes of rotation to be arranged on a side wall of the storage compartment. The storage compartment cover can thus be designed to be as slim as possible, since the retaining device is arranged outside the storage compartment cover. In order to be constructed as compactly as possible, the retaining device may be arranged on one or both sides of the storage compartment cover. In the case of a storage compartment cover of essentially rectangular design, the retaining device may be arranged on a small side in order to take up as little construction space as possible.

Furthermore, provision may be made for actuating buttons for releasing the retaining device to be arranged in the region of a side wall of the storage compartment, in particular in a readily accessible manner on the upper side thereof. The actuating buttons thus do not take up any construction space in the storage compartment cover and can readily be reached irrespective of the position of the storage compartment cover.

In one embodiment, provision may be made for the storage compartment to have a printer and/or a fax machine and/or a copier. The latter may be integrated in a deposit compartment, with the swung-up cover of the storage compartment being designed as a paper support for the printer and/or the fax machine and/or the copier.

In one embodiment, provision may be made for the driving device to have an energy store, preferably spring store or gas-filled spring store, for storing driving energy. The energy store is preferably designed in such a manner that it is charged during the closing of the storage compartment cover. During the opening, it acts upon the storage compartment cover in the opening direction and opens the latter by discharging the stored kinetic energy. The storage compartment is thus largely independent of external energy, e.g. electric energy, and is particularly highly reliable. In order to obtain a convenient opening movement, the energy store is connected to a damping device, so that the opening movement takes place in a damped manner.

The energy store may be designed in two parts by each axis of rotation being connected to one energy store. These energy stores may be designed separately and independently, with the result that the kinetic energy of one axis of rotation is stored in the energy store provided for it.

In one embodiment, the two energy stores may also be connected to each other, so that each energy store stores part of the kinetic energy, preferably approximately half of it. As a result, the two energy stores can be of correspondingly smaller dimensions. In addition, the respective lock of the axis of rotation is acted upon with a smaller force, as a result of which a smaller force is also required in order to release the locking device. This enables, in particular, a short pressing stroke to be obtained for the actuating buttons. Particularly convenient operation and a good sense of quality are therefore achieved.

Embodiments are also possible in which the energy store is divided into a plurality of energy stores, in particular four, six or eight energy stores, in order to make particularly good use of the existing construction space.

Use of the storage compartment in particular in road vehicles, for example passenger vehicles and/or trucks and/or coaches, is envisaged. However, it is also possible for the storage compartment to be used in ships or aircraft.

Further features and embodiments of the invention emerge from the claims, the figures and the description of the figures. The features and combinations of features mentioned above and explained below can be used not only in the combination indicated in each case, but also in other combinations or on their own without departing from the scope of the invention.

Further embodiments of the invention are illustrated and explained in the figures.

DETAILED DESCRIPTION OF THE INVENTION

Figure 1:
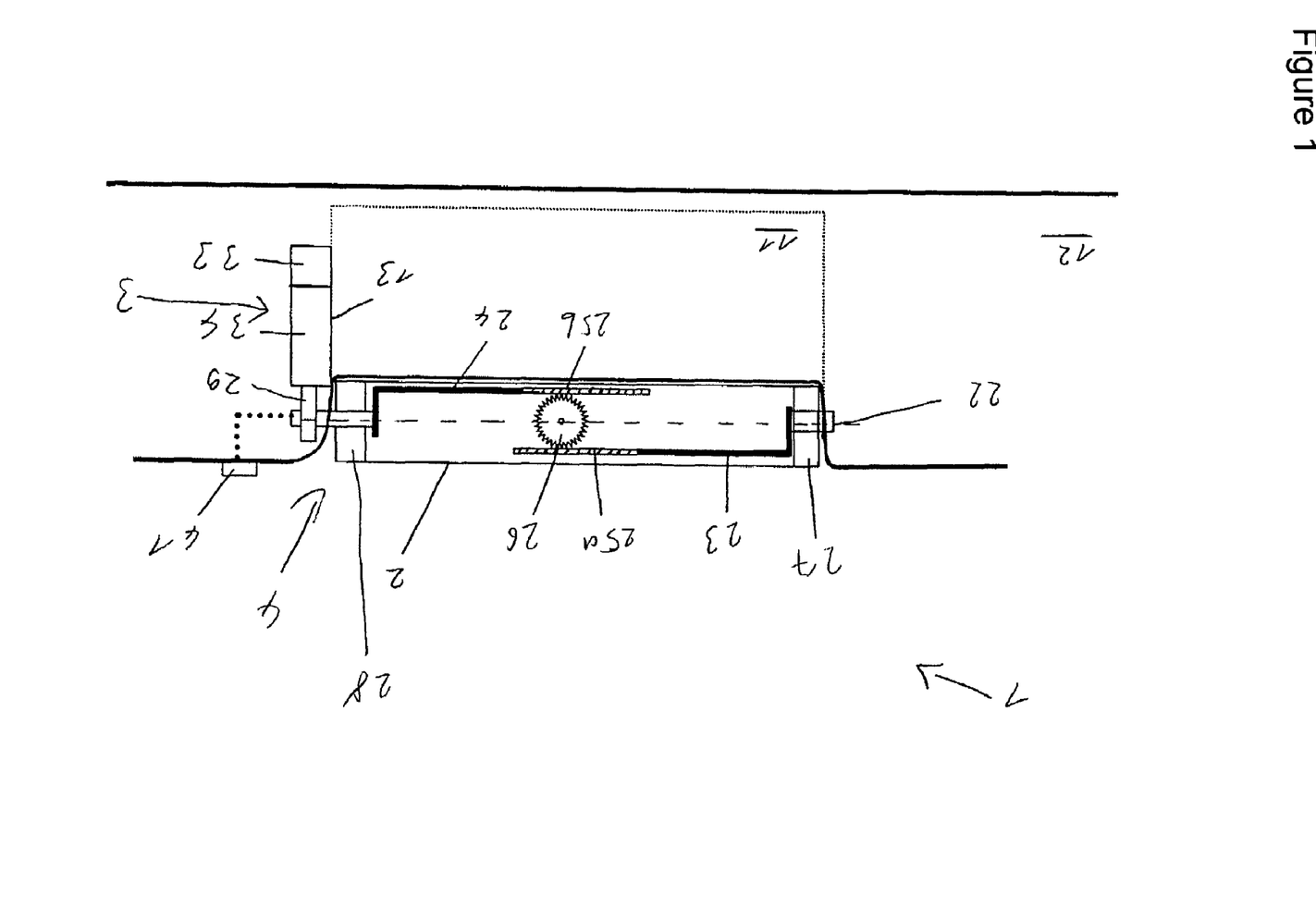
FIG. 1 shows a schematic illustration of a storage compartment in a central console with a closed storage compartment cover.

FIG. 1 shows a storage compartment 1 in a central console 12 of a passenger vehicle. The central console 12 may be arranged between a driver's seat and front passenger's seat in a vehicle interior. The storage compartment has a deposit compartment 11, which is bounded by side walls 13, for accommodating objects. The storage compartment 1 is closed upward by a cover 2. The storage compartment cover 2 has two axes of rotation 22, 21 which are locked in the closed position by means of a retaining device 4. The lock of an axis of rotation 21, 22 can be released via buttons 41 arranged on the upper side of the central console 12 in the region of a side wall 13. A driving device 3 then automatically opens the storage compartment cover in a damped manner by pivoting the storage compartment cover 2 either about the first axis of rotation 21 or the second axis of rotation 22 in the opening direction.

The storage compartment cover 2 has two spindle stubs 23, 24 in each case in the region of the axes of rotation 21, 22. The spindle stubs are mounted in a linearly displaceable manner on the storage compartment cover 2 and run along the particular axis of rotation 21, 22. They are connected to each other via racks 25a and 25b which both mesh with a toothed wheel 26. The toothed wheel 26 is mounted rotatably on the storage compartment cover and connects the spindle stubs 23 and 24 in opposite directions. If one spindle stub 23 or 24 is acted upon axially, e.g. is pressed into the storage compartment cover 2, then it uses the deflecting wheel 26 to likewise pull the other spindle stub 24 or 23 into the storage compartment cover 2. The spindle stubs are acted upon by a spring and are prestressed in such a manner that they protrude out of the storage compartment cover 2. Closing of the storage compartment cover 2 causes the spindle stubs 23, 24 to be automatically latched in place by reaching beyond the storage compartment cover 2, in the closed position thereof, and reaching into a retaining device 4.

The retaining device 4 has two bars 27 and 28 which are arranged on the end sides of the storage compartment cover 2 and connect the two axes of rotation 21, 22 to each other. In the region of the second axis of rotation 22, the bar 28 reaches through the side wall 13 of the storage compartment 1 and is connected in a rotationally fixed manner to a driving device 3 which has a toothed wheel 29. The toothed wheel 29 is in turn connected to a gear 34 which has a spring store with a damper 33.

Figure 2:
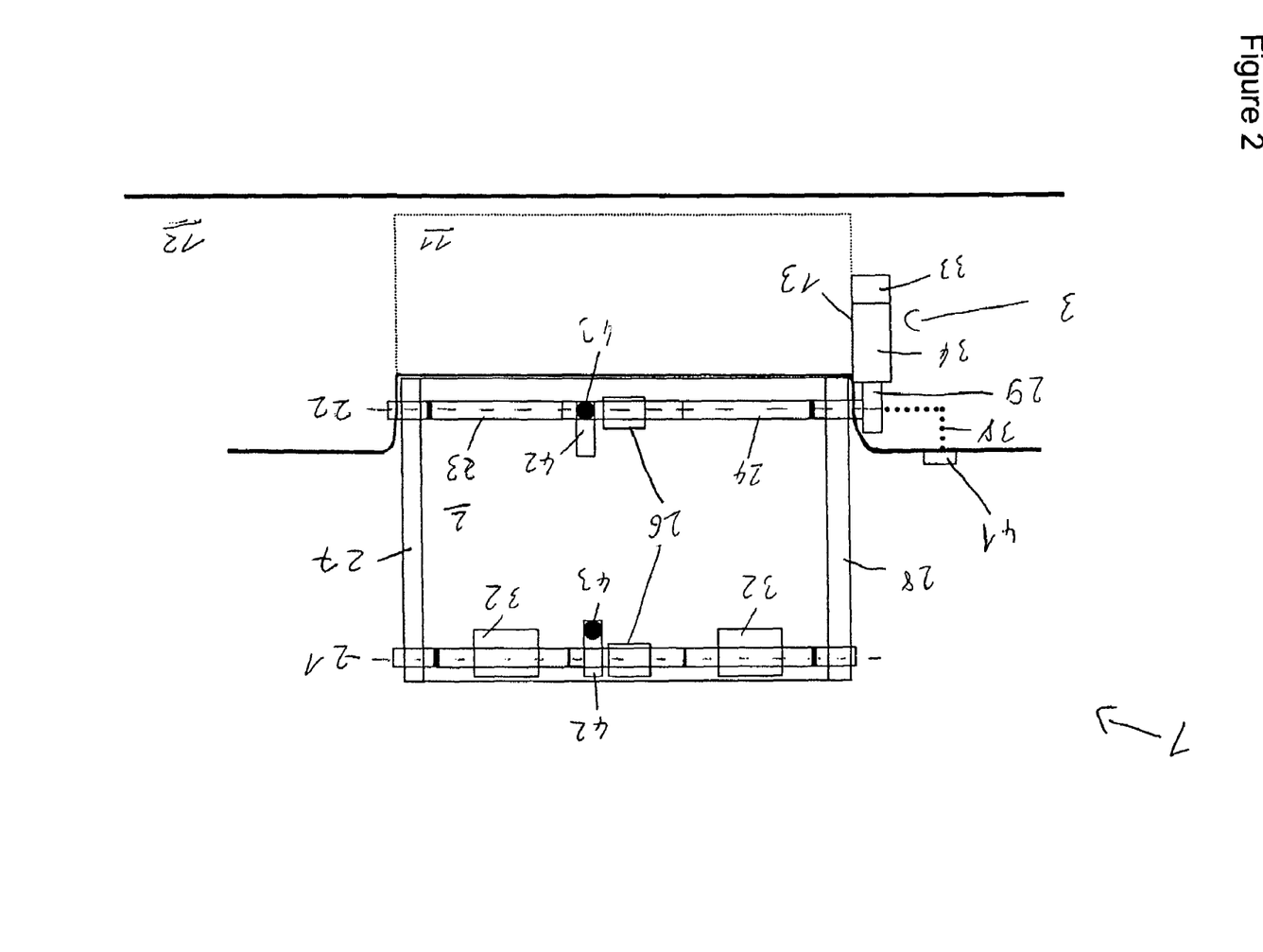
FIG. 2 shows an illustration of the storage compartment with the storage compartment cover open in one direction.

If the lock of the first axis of rotation 21 is released, by the connection between the bar 28 or bar 27 and the side wall being released by means of the button 41, by axially pressing on the spindle stubs 23 and 24 of the first axis of rotation 21, then the driving device 3, which comprises the energy store with the damper 33, the gear 34 and the toothed wheel 29, pivots the bar 28 in the opening direction. Since the bar 28 is also connected to the spindle stub 24 of the first axis of rotation, it carries along the storage compartment cover 2 and the latter is pivoted about the axis of rotation 22 and automatically opens the storage compartment, as illustrated in FIG. 2.

A blocking device 42 is arranged in the region of the axes of rotation 21, 22 and prevents the two axes of rotation 21, 22 from being able to be released when the storage compartment cover 2 is open. A ball 43 is guided movably in the blocking device 42 and, when the cover is positioned vertically, drops downward and thus prevents the linear displacement of the spindle stubs 23, 24.

The two buttons 41 are connected to the first axis of rotation 21 and the second axis of rotation 22 respectively via a Bowden cable. When one button 41 is actuated, an axial pressure is exerted via the Bowden cable 38 on the spindle stub 24 of the corresponding axis of rotation 21 or 22, with the result that the spindle stubs 23 and 24, which are connected in opposite directions, are pushed into the storage compartment cover 2 and the corresponding axis of rotation 21 or 22 is released.

Figure 3:
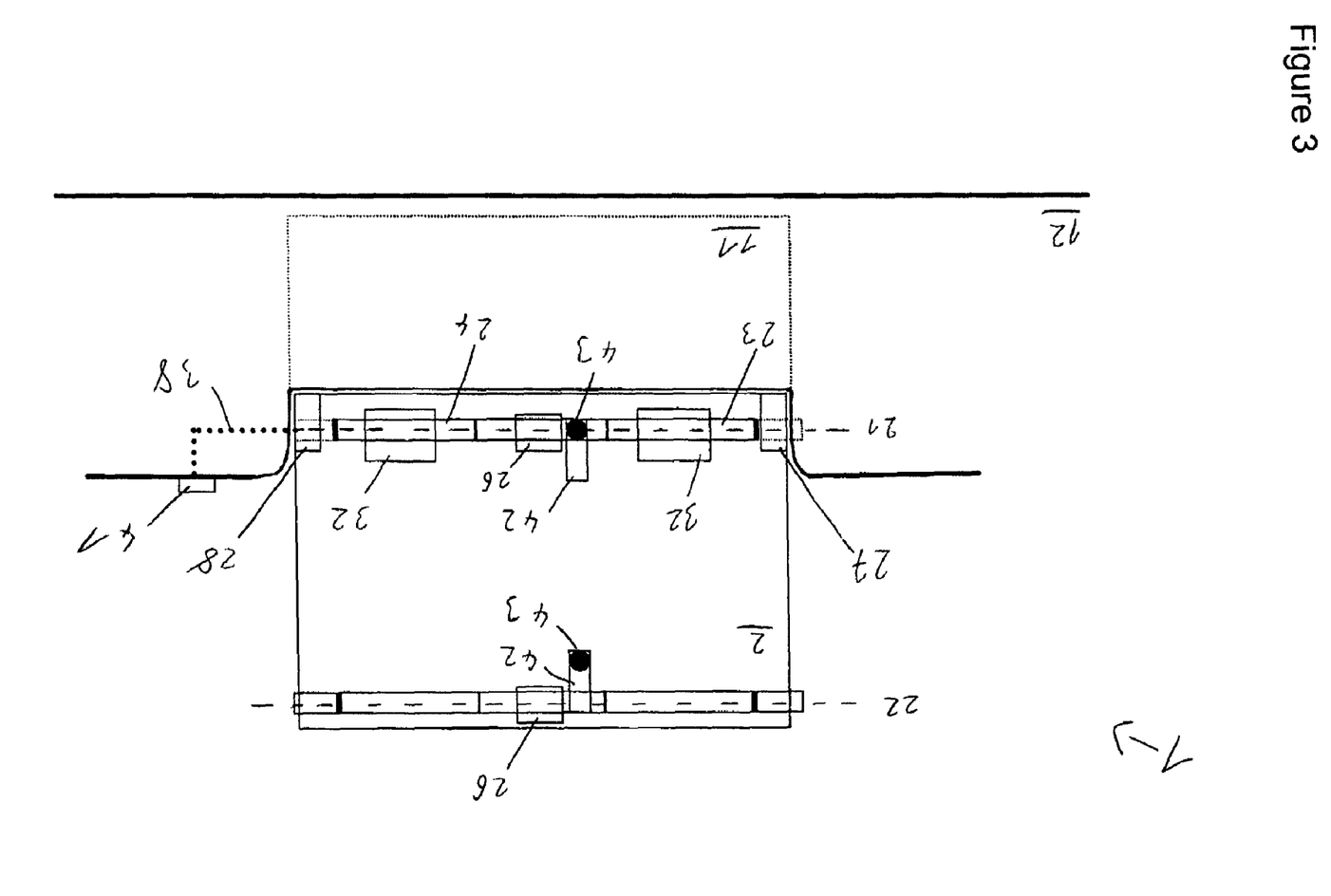
FIG. 3 shows an illustration of the storage compartment with the storage compartment cover open in the opposite direction.

In contrast to the energy store 33 of the second axis of rotation 22, the energy store 32 of the first axis of rotation 21 is arranged within the storage compartment cover 2, as illustrated in FIG. 3.

The energy store of the first axis of rotation 21 is in two parts, each spindle stub 23 and 24 being connected to one energy store 32. The energy stores 32 each have a spring, which is wound around the spindle 23 or 24 and has a damper, and act between the storage compartment cover and the spindle stubs 23 and 24 to rotate the storage compartment cover 2. The energy stores 32 act upon the storage compartment cover 2 in the opening direction.

If the lock of the second axis of rotation 22 is released from the closed position, the energy stores 32 automatically rotate the storage compartment cover in a damped manner about the first axis of rotation into an open position. When the button 42 is actuated to release the lock of the second axis of rotation, an axial pressure is exerted via a Bowden cable 38 on the spindle stub 24 of the second axis of rotation 22. The latter is pushed axially into the housing of the storage compartment cover 2 and released from the retaining device 4. The bars 28 and 27 remain connected to the side wall 13 of the storage compartment 1 and, in contrast to the above-described release of the first axis of rotation 21, do not pivot together with the storage compartment cover 2 in the opening direction when the second axis of rotation 22 is released.

The energy stores 32 and 33 are charged during the manual closing of the storage compartment cover 2 by the storage compartment cover being closed counter to the spring force of the energy stores 32 and 33. The spring of the energy store 32, 33 is prestressed and then remains stressed until the next opening process.

The components of the storage compartment cover 2, for example the energy stores 32, spindle stubs 23, 24, toothed wheel 26 and blocking device 42, are arranged within the storage compartment cover and are covered by a panel, so that they are not visible from the outside. The panel and the outside of the storage compartment cover are provided with a covering of leather or fabric or wood in order to match the design of the storage compartment 1 to the vehicle interior. The components of the retaining device 4 are arranged on the rear side of the side wall, so that they are not visible. Only the operating buttons 41 are arranged on the upper side of the central console 12, so that they are readily accessible.

Figure 4:
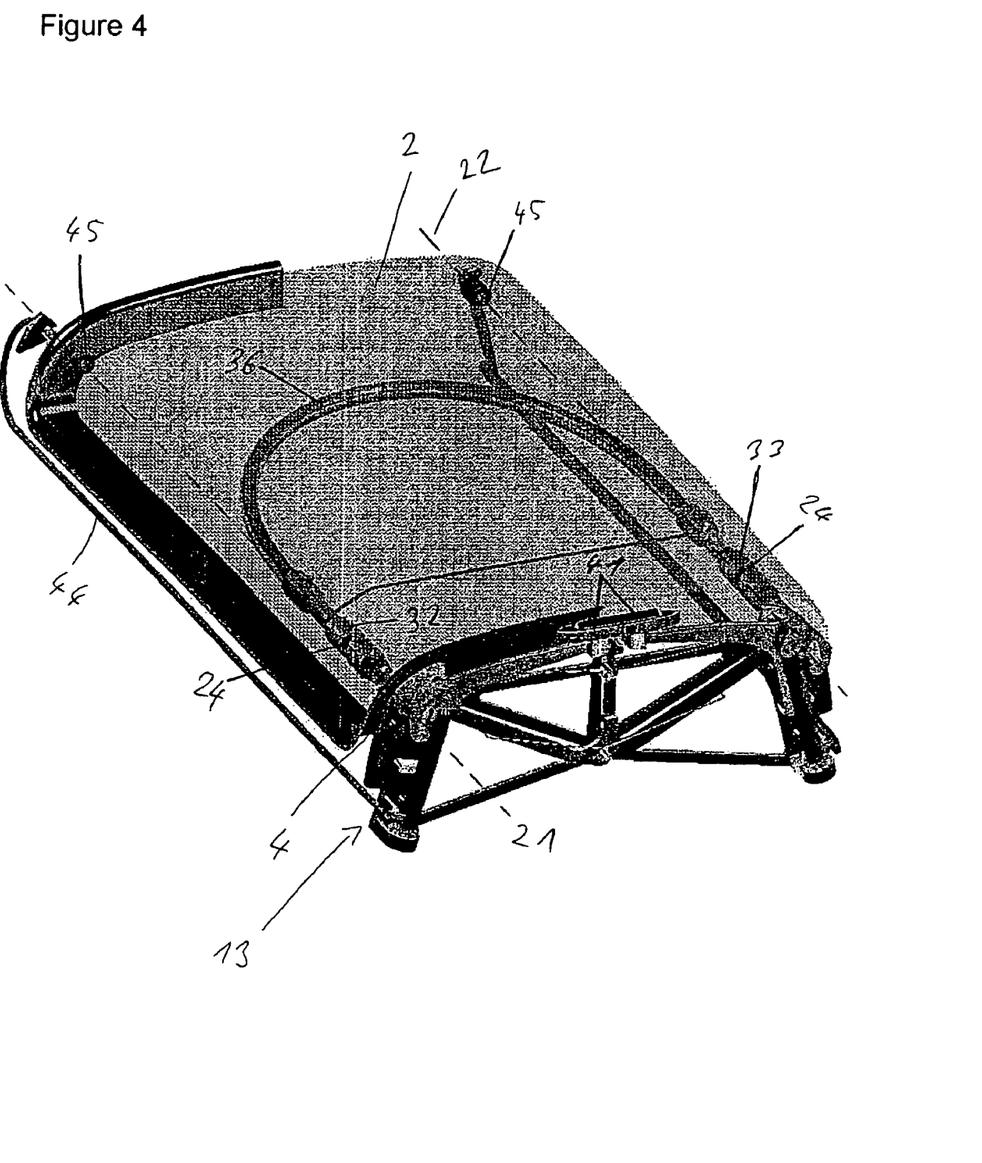
FIG. 4 shows storage compartment with an energy store arranged in the storage compartment cover.

The exemplary embodiment illustrated in FIG. 4 shows an embodiment of a storage compartment 1 in which, in contrast to the above-described exemplary embodiment, the two energy stores 32 and 33, i.e. the energy store 32 of the first axis of rotation 21 and the energy store 33 of the second axis of rotation 22, are arranged within the storage compartment cover 2. The retaining device 4 together with the two operating buttons 41 for pivoting up the storage compartment cover 2 are arranged outside the storage compartment cover 2 in the region of the side wall 13, as in the above-described exemplary embodiment.

The energy stores 32 and 33 arranged in the region of the axes of rotation 21 and 22 are connected to each other via a shaft 36. The shaft is guided within the storage compartment cover 2 and transfers torque between the two energy stores 32 and 33. Each energy store 32 or 33 stores part of the torque necessary for pivoting the storage compartment cover 2, with the energy stores 32 and 33 being equalized via the shaft 36. The energy stores 32 and 33 can thus be of smaller dimensions and, as a result, require a smaller amount of construction space. In addition, a smaller force is required in order to keep the energy stored in the particular energy store 32 or 33. This brings about a smaller release force for releasing the particular axis of rotation and therefore a more convenient operation by means of the buttons 41. As a result, these buttons 41 can be designed to be correspondingly smooth-running or can be designed with a short pressing stroke.

In the region of the axes of rotation 21 and 22, two short spindle stubs 24, which are connected to the energy stores 32 and 33, are arranged on that side of the storage compartment cover 2 which faces the retaining device 4. The energy stores 32 and 33 have wire springs which are mounted on the spindle stubs 24 and engage between the storage compartment cover 2 and the spindle stubs 24. A damping device, e.g. a viscous brake, is connected to the energy stores 32 and 33 and damps the opening movement of the storage compartment cover 2.

On that side of the storage compartment cover 2 which faces away from the retaining device 4, the storage compartment cover has mounts for plug-in spindles 45 in the region of the axes of rotation 21, 22. The short plug-in spindles 45 are mounted in a linearly displaceable manner in the side wall of the storage compartment 1. A Bowden cable 44 or a transmission linkage connects the plug-in spindles 45 to an actuating button 41. If a button 41 is actuated and therefore the corresponding axis of rotation 21 or 22 is released, then the button 41 acts via the Bowden cable 44 on the plug-in spindle 45 and pulls the latter back out of the mount in the storage compartment cover 2. Both sides of the storage compartment cover 2 are therefore released in the region of the axis of rotation 21 or 22, with the result that the cover can automatically be pivoted up.

Figure 5:
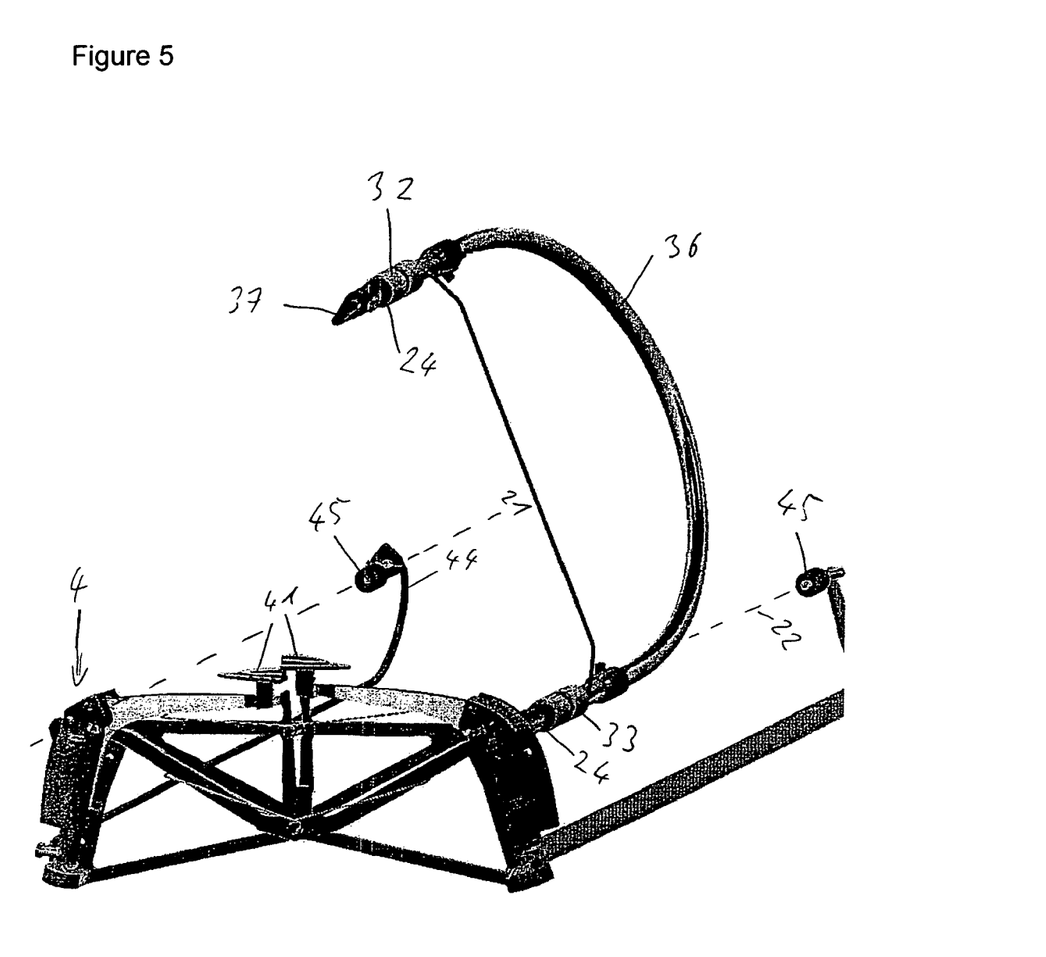
FIG. 5 shows an illustration of the cut-out storage compartment cover.

FIG. 5 shows an open position of the storage compartment cover 2. The left button 41 has released the axis of rotation 21, as described above, so that the storage compartment cover, driven by the energy stores 32 and 33, is pivoted into the open position.

At its end facing the retaining device 4, the spindle stub 24 has an elliptically shaped cam 37. The latter is connected fixedly to the particular spindle stub 24 and reaches beyond the storage compartment cover 2 and into the retaining device 4. When the axis of rotation 21, 22 is locked, the retaining device secures the cam 37 in a rotationally fixed manner by the retaining device 4 engaging in a form-fitting manner around the cam. The spring of the energy store 32 or 33 can therefore be supported on the spindle stub 24, which is now mounted in a rotationally fixed manner, and can exert a torque on the storage compartment cover 2 or can absorb such a torque.

The retaining device 4 has a mount which engages in a form-fitting manner around the cam. The mount is designed in two parts, the lower part being arranged in a fixed manner and the upper part being mounted in a displaceable manner and being connected to a button 41. When the button 41 is actuated, the upper part of the mount is pulled back and releases the cam 37. At the same time, the button 41 pulls the plug-in spindle 45 back via the Bowden cable 44 and thus entirely releases the corresponding axis of rotation 21 or 22.

Figure 6:
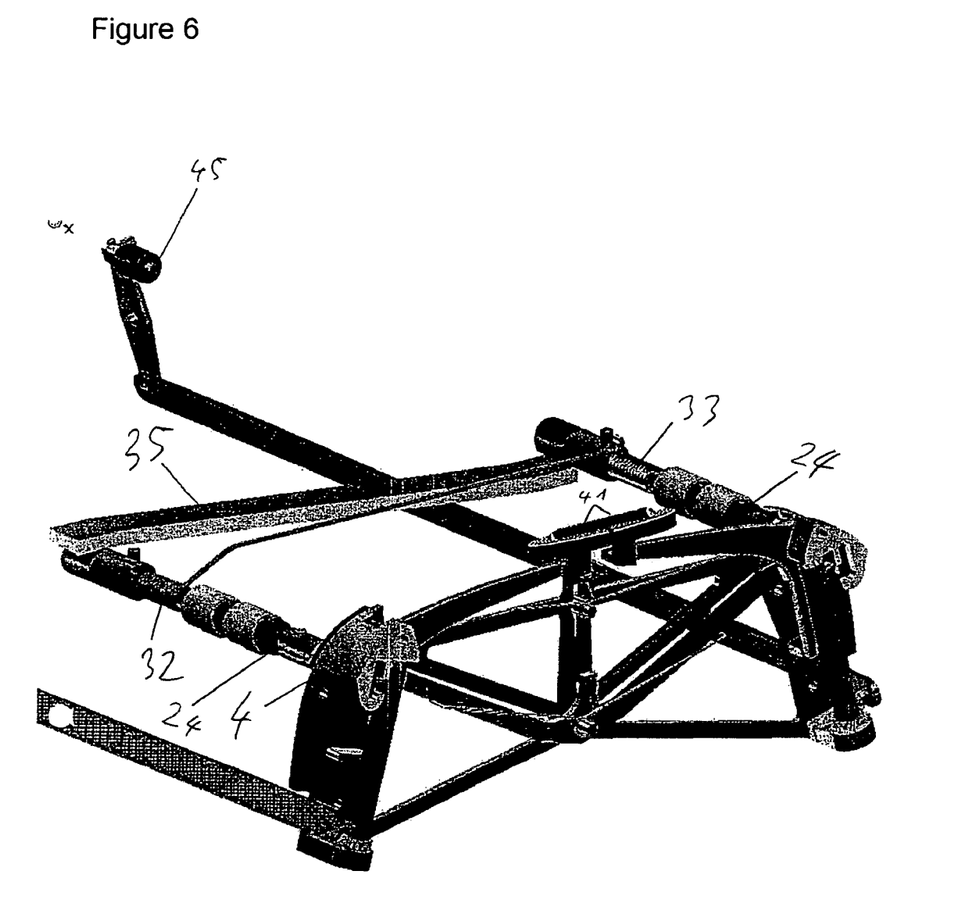
FIG. 6 shows an illustration of an alternative embodiment of the storage compartment cover with a rack.

FIG. 6 describes an exemplary embodiment which is constructed such that it largely corresponds to the exemplary embodiment described in FIGS. 4 and 5. As a modification to the embodiment illustrated there, energy stores 32 and 33 accommodated in the storage compartment cover 2 are connected here to a rack 35. The rack 35 is mounted in a linearly displaceable manner in the storage compartment cover 2 and meshes at its two ends with the spindle stubs 24. The rack 35 therefore transfers torque between the energy stores 32 and 33.

The invention claimed is:

1. A storage compartment for a vehicle comprising:
a storage compartment cover for closing a deposit compartment, the storage compartment cover having axes of rotation on two opposite longitudinal edges, being openable in a first of two opening directions by pivoting from a closed position about one of said axes of rotation and in a second of the two opening directions by pivoting from the closed position about the other of said axes of rotation, and being lockable in the closed position, and
a driving device that automatically pivots the storage compartment cover in either the first of the two opening directions about the one of said axes of rotation or the second of the two opening directions by pivoting from the closed position about the other of said axes of rotation after release of a lock keeping the storage compartment cover in the closed position,
wherein the driving device has an energy store, which is designed in two energy store parts and which automatically opens the deposit compartment by pivoting the storage compartment cover, and
wherein each axis of rotation is connected to one of the energy store parts and at least one of the energy store parts is arranged within the storage compartment cover.

2. The storage compartment as claimed in claim 1, wherein the energy store is charged during manual closing of the storage compartment cover and is discharged when the storage compartment cover is automatically opened.

3. The storage compartment as claimed in claim 1, wherein the energy store has a spring with a damping device so that the opening movement takes place in a damped manner.

4. The storage compartment as claimed in claim 1, wherein the lock includes a retaining device which is designed for locking both axes of rotation arranged on a side wall of the deposit compartment.

5. The storage compartment as claimed in claim 4, wherein a release button is arranged in a region of the side wall of the deposit compartment, is connected to the retaining device, and interacts with the retaining device to release one axis of rotation.

6. The storage compartment as claimed in claim 4, wherein the storage compartment cover has spindle stubs which are arranged in the region of the axes of rotation and run along the axes of rotation, and wherein one spindle stub extends beyond one side of the storage compartment cover.

7. The storage compartment as claimed in claim 1, wherein one of the axes of rotation has two spindle stubs which can be displaced linearly on the storage compartment cover, and wherein each spindle stub has, at an end facing the other spindle stub, a rack which meshes via a toothed wheel with a rack of the other spindle stub in such a manner that the spindle stubs move in opposed directions.

8. The storage compartment as claimed in claim 1, wherein one of the axes of rotation has a blocking device which is designed in such a manner that it blocks a release of that one of the axes of rotation when the storage compartment cover is open.

9. The storage compartment as claimed in claim 3, wherein one of the energy store parts is arranged in the storage compartment cover, and the other of the energy store parts is arranged in the region of a side wall of the deposit compartment.

10. The storage compartment as claimed in claim 4, wherein the retaining device has a bar which connects the axes of rotation, is connected to one of the energy store parts, and, after the one of the axes of rotation is released, pivots the storage compartment cover about the other of the axes of rotation in the opening direction.

11. The storage compartment as claimed in claim 1, wherein the energy store parts of both axes of rotation are accommodated in the storage compartment cover, and wherein both energy store parts are arranged in a region of the axes of rotation.

12. The storage compartment as claimed in claim 11, wherein the energy store parts are connected by at least one of a rack and a flexible shaft so that the two energy store parts interact to pivot the storage compartment cover about one of the axes of rotation.

13. The storage compartment as claimed in claim 11, wherein the energy store parts are designed for storing equal amounts of energy in the energy store parts by at least one of the rack and the flexible shaft transferring energy between the energy store parts when the storage compartment cover is pivoted.

14. The storage compartment as claimed in claim 11, wherein each of the spindle stubs, at an end reaching beyond the storage compartment cover, has a cam which is elliptical or polygonal in shape and engages in the latter in such a manner that at least one of the spindle stubs is rotationally fixed in the retaining device.

15. The storage compartment as claimed in claim 2, wherein the energy store has a spring with a damping device so that the opening movement takes place in a damped manner.

16. The storage compartment as claimed in claim 2, wherein the lock includes a retaining device which is designed for locking both axes of rotation arranged on a side wall of the deposit compartment.

17. The storage compartment as claimed in claim 16, wherein a release button is arranged in a region of the side wall of the deposit compartment, is connected to the retaining device, and interacts with the retaining device to release one axis of rotation.

18. The storage compartment as claimed in claim 16, wherein the storage compartment cover has spindle stubs which are arranged in the region of the axes of rotation and run along the axes of rotation, and wherein one spindle stub extends beyond one side of the storage compartment cover.

19. The storage compartment as claimed in claim 2, wherein one of the axes of rotation has two spindle stubs which can be displaced linearly on the storage compartment cover, and wherein each spindle stub has, at an end facing the other spindle stub, a rack which meshes via a toothed wheel with a rack of the other spindle stub in such a manner that the spindle stubs move in opposed directions.

20. A storage compartment for a vehicle comprising:
a pivotably mounted storage compartment cover for closing a deposit compartment, the storage compartment cover having axes of rotation on two opposite longitudinal edges, being able to be opened in two directions, and pivoting about one of said axes of rotation, the two axes of rotation being locked in the closed position of the storage compartment cover,
a driving device which automatically pivots the storage compartment cover about the other axis of rotation in the opening direction after release of a lock of one axis of rotation, and
a retaining device which is designed for locking both axes of rotation arranged on a side wall of the deposit compartment,
wherein the driving device has an energy store which is designed in two parts,
wherein each axis of rotation is connected to one energy store part and at least an energy store part of a first axis of rotation is arranged within the storage compartment cover,
wherein the retaining device has a bar which connects the two axes of rotation, is connected to the energy store of the second axis of rotation and, after the first axis of rotation is released, pivots the storage compartment cover about a second axis of rotation in the opening direction,
wherein the bar is designed in such a manner that, when the second axis of rotation is released, the bar is arranged in a fixed position on the side wall and forms a rotary bearing of the first axis of rotation, and
wherein, when the first axis of rotation is released, the bar pivots together with the storage compartment cover.

* * * * *